United States Patent
Nicholson et al.

(10) Patent No.: US 6,325,433 B1
(45) Date of Patent: Dec. 4, 2001

(54) MAGNETIC METAL OBJECT RETRIEVER WITH COVER

(75) Inventors: Roy Vance Nicholson, Boone; Robert W. Lackey, Hickory, both of NC (US)

(73) Assignee: Home Impressions, Hickory, NC (US)

( * ) Notice: Subject to any disclaimer, the term of this patent is extended or adjusted under 35 U.S.C. 154(b) by 0 days.

(21) Appl. No.: 09/204,942

(22) Filed: Dec. 3, 1998

(51) Int. Cl.⁷ ....................................................... B66F 11/00
(52) U.S. Cl. ........................................................... 294/65.5
(58) Field of Search ................................ 294/19.1, 65.5; 150/160, 161; 15/247; 324/326

(56) References Cited

U.S. PATENT DOCUMENTS

| | | | |
|---|---|---|---|
| D. 274,607 | 7/1984 | Schaefer et al. | D10/47 |
| D. 274,704 | 7/1984 | Garrett et al. | D10/47 |
| D. 377,908 | 2/1997 | Yue | D10/47 |
| 2,417,762 * | 3/1947 | Koller | 294/65.5 |
| 2,947,563 * | 8/1960 | Stitt | 294/65.5 |
| 3,492,746 * | 2/1970 | Hauck | 40/2 |
| 3,861,434 * | 1/1975 | Harding | 150/52 G |
| 4,105,239 * | 8/1978 | Akczinski, Sr. | 294/65.5 |
| 4,797,618 | 1/1989 | De Vries | 324/326 |
| 4,802,702 * | 2/1989 | Bownds | 294/65.5 |
| 4,983,281 | 1/1991 | Montelione | 209/418 |
| 5,138,262 | 8/1992 | Podhrasky et al. | 324/327 |
| 5,576,621 | 11/1996 | Clements | 324/239 |

* cited by examiner

Primary Examiner—Hezron Williams
Assistant Examiner—Henry S. Andersen
(74) Attorney, Agent, or Firm—J. Herbert O'Toole; Nexsen Pruet Jacobs & Pollard, LLC

(57) ABSTRACT

A magnetic metal object retriever 10 with cover 20 having a magnet 140 for attracting metal objects 250. The magnet 140 is connected to an extendable handle 40 and covered by a cover 20. The magnetic metal object retriever 10 with cover 20 is used to gather metal objects 250 such as nails and screws, which are attracted by the magnetic pull from the magnet 140 and such metal objects 250 collect on the exterior of the cover 20. When the cover 20 is removed from the magnet 140, the metal objects 250 are easily removed and can be reused or disposed of.

6 Claims, 7 Drawing Sheets

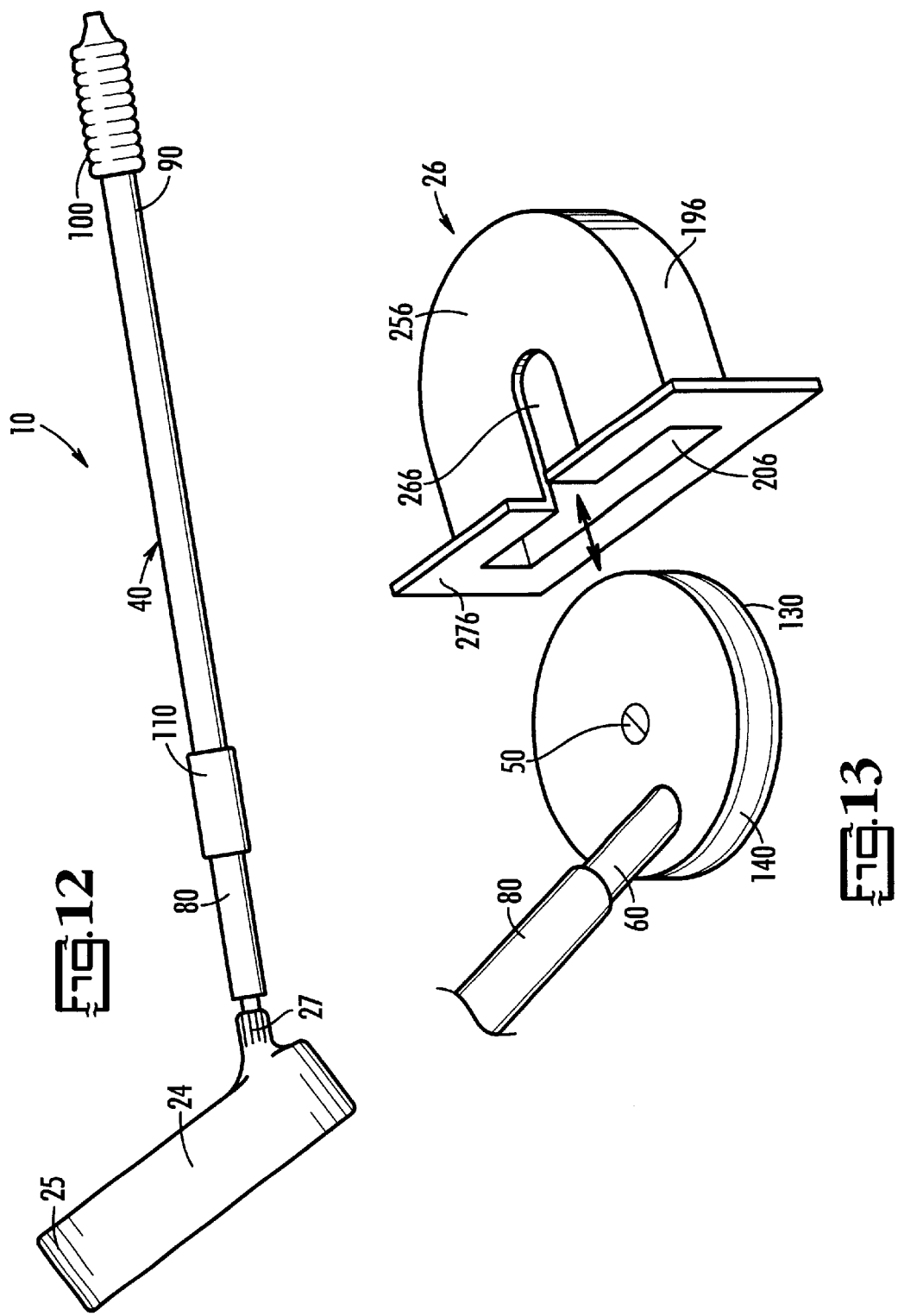

MAGNETIC METAL OBJECT RETRIEVER WITH COVER

BACKGROUND OF THE INVENTION

1. Field of Invention

The present invention relates in general to magnets used to gather metal objects and in particular a magnetic metal object retriever with cover used to pick up various items such as nails, screws, nuts, bolts and easily remove such items from the magnetic metal object retriever by simply removing a cover that is attached to the magnet that is in the head end of the magnetic metal object retriever 10.

2. Description of Prior Art

Magnets are often used to attract certain objects from various places or to hold objects in a specific place. Often the magnets are small enough to be hand-held and require no covering or handle to be used such as by children in science class. Also, magnets are used by people in the construction industry to pick up extraneous nails and screws from shop floors or around the perimeter of houses that have been newly roofed. Magnets are also used in various machines to separate out metal objects from various mediums. However, in all the aforementioned uses the metal objects must at some point be removed from the retrieving magnet. This can be a laborious process as well as harmful if the objects are sharp and pointed. Also, simply holding the magnet in the user's hands limits the places the magnet can be placed to attract such metal objects to within reaching distance of the user.

The present invention solves the previously cited problems and others inherent in the art by providing a magnet being a part of a head end which is connected to an extendible handle for placing the magnet in difficult and hard to reach places. Also a cover is provided to cover the head end which can easily be removed thereby easily removing any metal items that are attracted to the magnet and resting against the cover.

SUMMARY OF THE INVENTION

An objective of the present invention is to provide an easy to use tool that will pick up stray metal objects.

Another objective of the present invention is to provide a way to collect metal objects, such as nails and screws without harm to the person picking up such objects.

The present invention allows for metal objects to be collected and distributed to a specified location with little effort or mess.

Still another objective of the magnetic metal object retriever and cover is to allow for a quick and easy way to remove such metal objects all at one time and not one by one.

The present invention offers a versatile tool wherein the handle is expandable and retractable so that various heights and short or long distances can be reached by the tool.

A further objective of the present invention is to provide a cover over the end of a magnet that will also protect the user's hands from the sharp edges and ends of the metal objects being retrieved.

And still a further objective of the present invention is to provide an economical and safe method of retrieving stray and scattered metal objects with one simple, lightweight and affordable tool.

It is also an objective of the present invention to provide a magnetic metal object retriever with cover having a magnet for attracting metal objects. The magnet connected to an extendable handle and covered by a magnet cover. The magnetic metal object retriever with cover are used to gather metal objects such as nails and screws, which are attracted by the magnetic pull from the magnet and such objects collect on the exterior of the magnet cover. When the magnet cover is removed from the magnet, the metal objects are easily removed and can be reused or disposed of.

The aforementioned objectives will be accomplished as well as other features and advantages of the present invention will become more apparent from the following detailed description. The description of the present invention discloses, in conjunction with the drawings which illustrate by way of example, the principles of the invention.

BRIEF DESCRIPTION OF THE DRAWINGS

FIG. 12 is a side elevation view of a third embodiment of the cover.

FIG. 13 is a partial perspective view of the fourth embodiment of the cover with the head end of the magnetic metal object retriever.

DETAILED DESCRIPTION OF THE INVENTION

Figure 1:
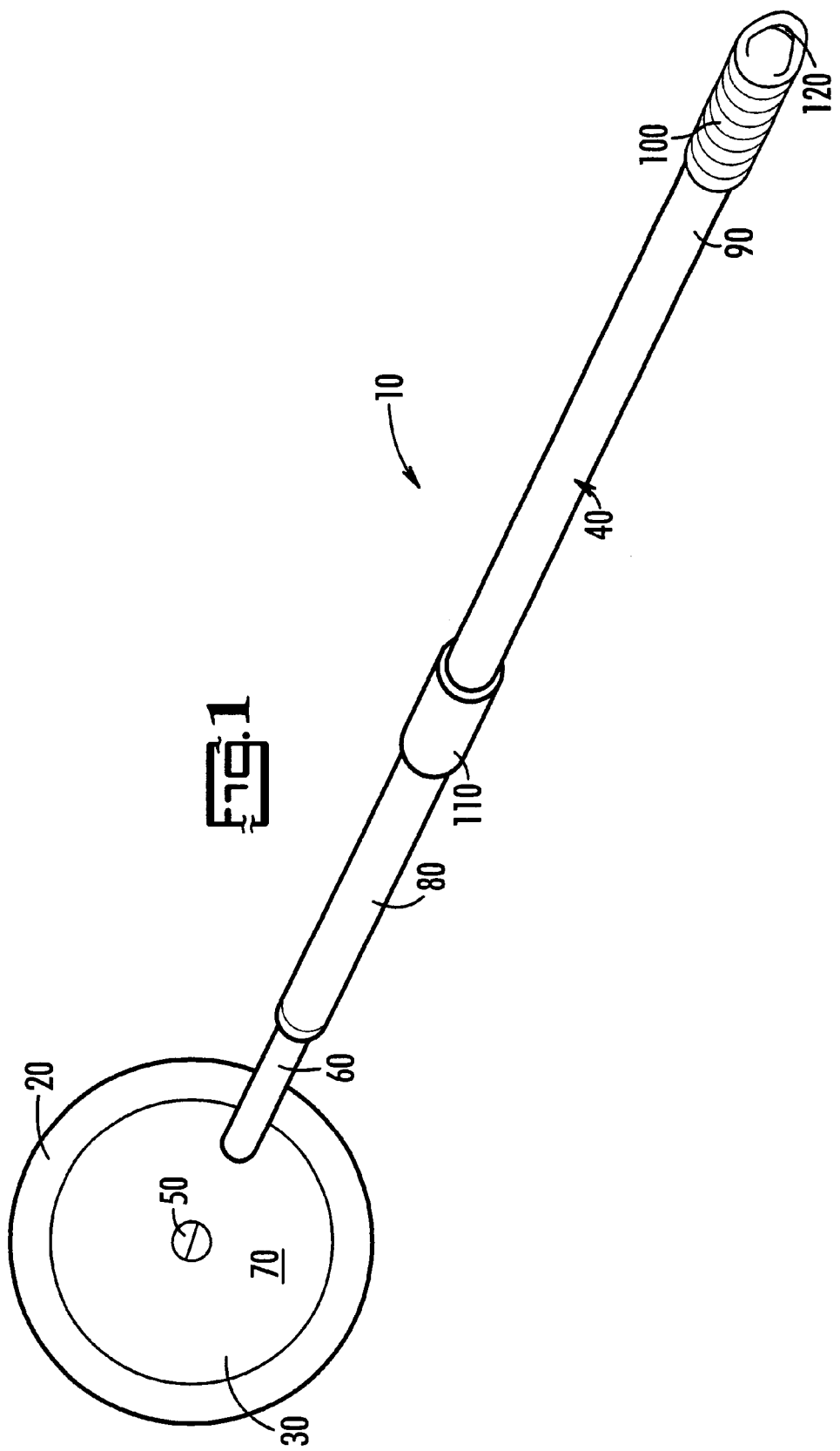
FIG. 1 is a top perspective view of the magnetic metal object retriever with cover.

According to this invention, it has been found that magnetic metal objects can be easily retrieved by the magnetic metal object retriever 10 with cover 20 and then removed therefrom by simply removing the cover 20 from the head end 30 of the magnetic metal object retriever 10. FIG. 1 is a top perspective view of the magnetic metal object retriever 10 with cover 20. The magnetic object retriever has a head end 30 and an extendible handle 40. The head end is connected together with a conventional connecting means such as a screw, bolt or rivet 50. The head end 30 is connected to the handle 40 by a shaft 60 which is connected at one end to the head end 30 by any conventional means, the preferred means being welded onto the top plate 70. The shaft 60 is connected at the opposite end to a lower end 80 of the handle 40 also by any conventional means. The lower end 80 of the handle 40 is slightly smaller in diameter that the upper end 90 of the handle 40 so as to be able to slide within the upper end 90 when the handle is compacted into a shorter length. The handle 40 is slidably extendible and is locked into place by handle locking means 110. The handle 40 can be made of any suitable material such as wood, plastic, metal or as in the preferred embodiment, aluminum. The handle locking means 110 twists either in a loosening manner to allow the handle 40 to be extended or retracted and then in a tightening manner to lock the handle 40 into place at whatever the desired length is. For example, if the magnetic object retriever 10 and cover 20 are to be used under a table, or behind a bush, the handle 40 may be extended fully to provide a long handle 40 allowing the head end 30 to be placed in hard-to-reach places. However, if the magnetic object retriever 10 with cover 20 is to be used on a shop floor or work bench, the handle 40 can be retracted to a very short length providing an easy to use and manageable handle 40. The handle 40 can also be retracted to a short length for storage or transportation so the magnetic object retriever 10 with cover 20 does not take up any unnecessary space and is easy to load and unload. Located on the upper end 90 of the handle 40 is a grip 100 which may or may not have a loop 120 for hanging the magnetic object retriever 10 and cover 20 when not in use. The grip 100 provides a grip portion for holding when using or extending and retracting the magnetic object retriever 10 with cover 20.

Figure 2:
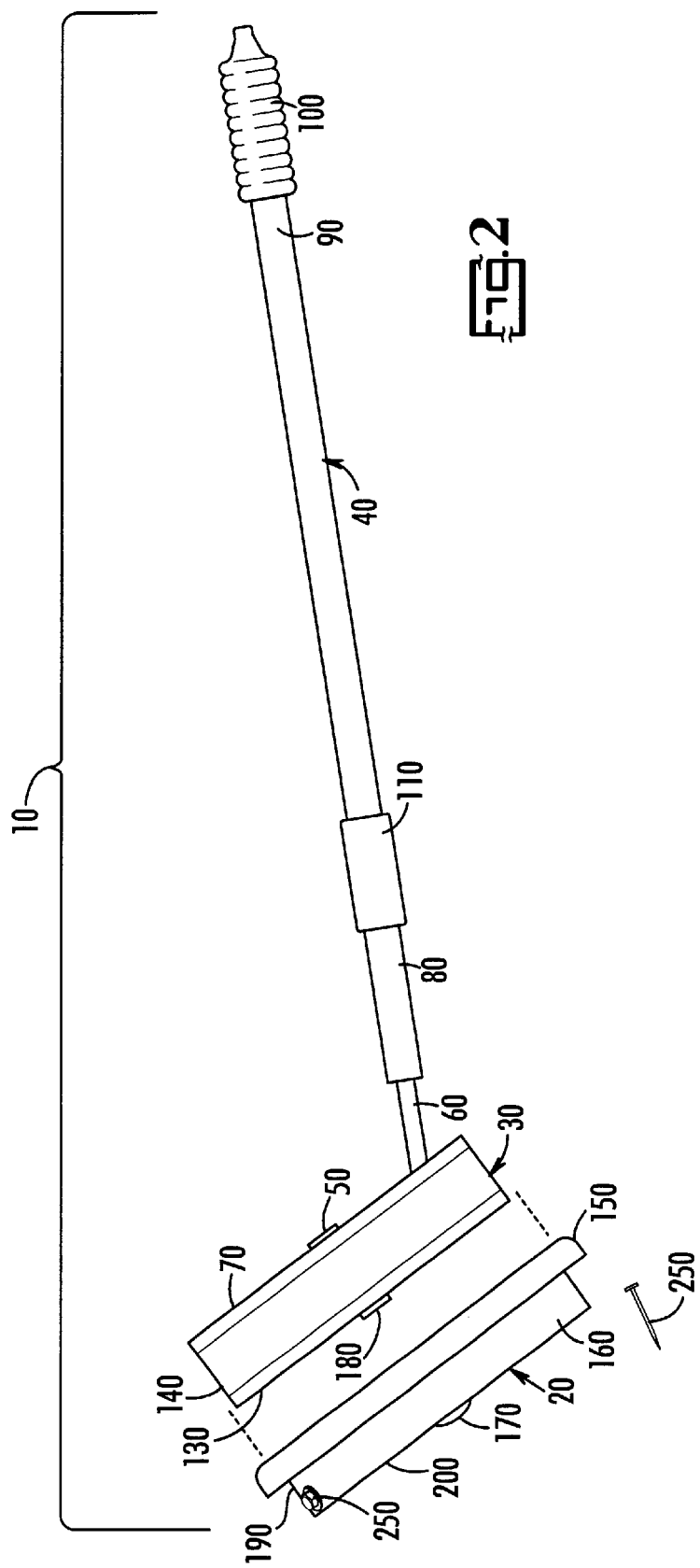
FIG. 2 is an exploded side elevation view of the magnetic metal object retriever with cover wherein the cover is removed.

FIG. 2 is an exploded side elevation view of the magnetic metal object retriever 10 with cover 20 wherein the cover 20 has been removed to illustrate the head end 30 more clearly. The head end 30 is made of a magnet 140 held between a top plate 70 and a bottom plate 130. Any type of conventional connecting means such as rivets, screws, rods, bolts and nails can be used to hold the head end 30 together, in the preferred embodiment a rivet 50 is inserted through an opening in the middle or center of each of the top plate 70, the magnet 140 and the bottom plate 130. Alternatively, 50 may be a bolt held in place with a nut 180. The connecting means may also be recessed within the top plate 70 and the bottom plate so that each plate is flat without any protruding elements,in which case the cover 20 would not need a dimple 170 and could be flat also. When in use, the head end 30 is then placed within the cover 20. The cover 20 has a lip 150 and also a body portion 160 comprised of a sidewall 190 integrally formed with a bottom 200 which form a cup within which the head end 30 of the magnetic metal object retriever can be placed. The sidewall 190 is integrally formed with the bottom 200 at one end of the sidewall 190 while the opposite end of the sidewall 190 is integrally formed with the lip 150 which overhangs the cover 20 making removal of the cover 20 easy. The lip 150 prevents the magnetic objects from sliding past the cover and attaching themselves to the bare magnet 140 when the cover 20 is being removed. The lip 150 helps to facilitate the removal of the cover 20 from the head end 30 by allowing the cover 20 to be easily grasped and manipulated. Also integrally formed within the middle or at the center of the bottom 200 is a dimple 170 which allows the nut 180 from the head end 30 of the magnetic object retriever 10 to rest undisturbed while the cover 20 is placed on the head end 30. The cover 20 in the preferred embodiment is made of plastic but may be constructed of any suitable material such as aluminum.

Figure 3:
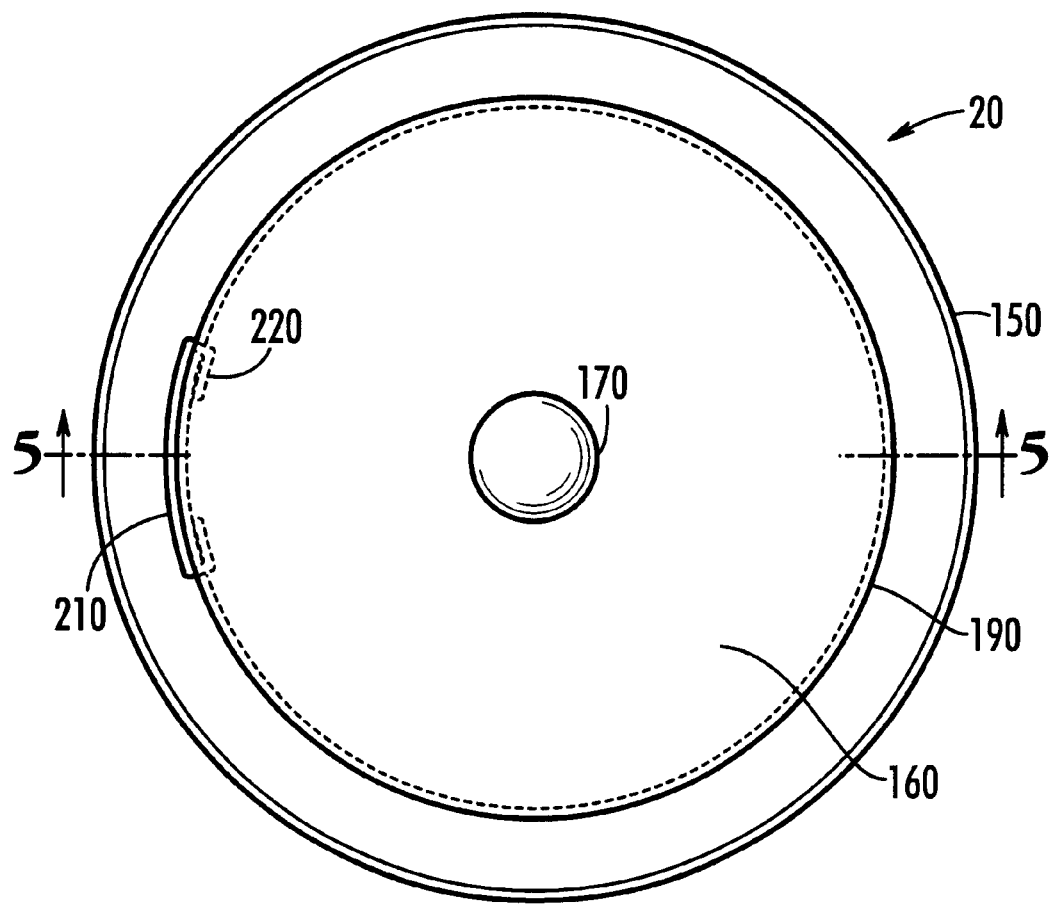
FIG. 3 is a bottom plan view of a first embodiment of the cover.

FIG. 3 is a bottom plan view of a first embodiment of the cover 20. The cover 20 has a lip 150 that is integrally formed with the sidewall 190 and extends the entire perimeter of the cover 20 which is circular in plan in the preferred embodiment, but may be made in any other desired shape, such as square, rectangular, triangular or elliptical, so long as the head end 30 of the magnetic article retriever 10 is the same shape as the cover 20. Connected to the sidewall 190 at one location is a metal clip 210. The ends 220 of the metal clip 210 are folded back toward the center of the metal clip 210 as a means of retention for the metal clip 210 on the cover 20. A more detailed explanation of this connection will be given later in reference to FIG. 6. The metal clip in the preferred embodiment is made of a ferrous metal.

Figure 4:
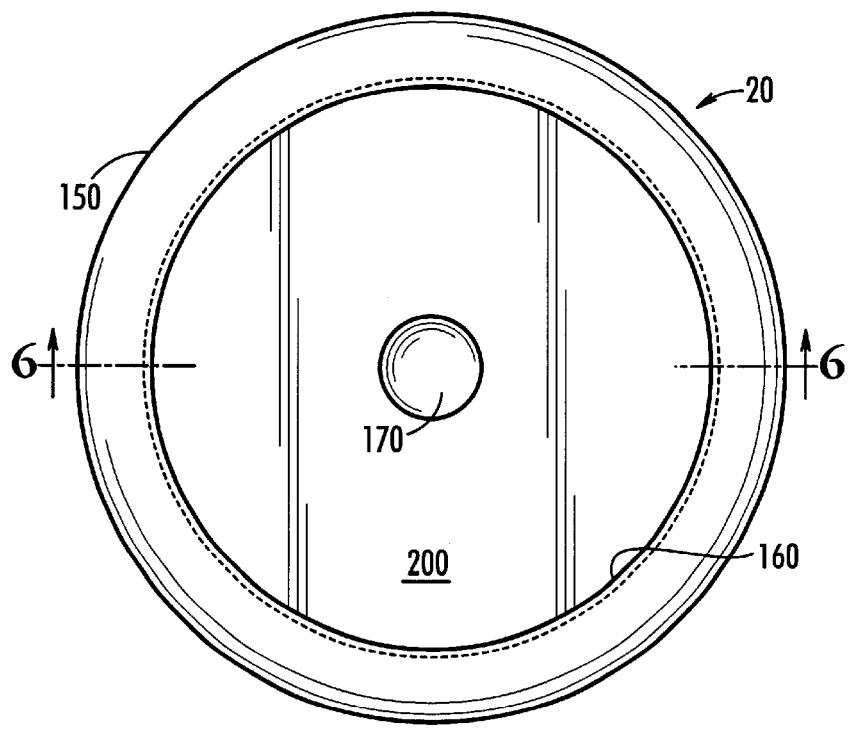
FIG. 4 is a top plan view of the first embodiment of the cover.

FIG. 4 is a top plan view of the first embodiment of the cover 20. The broken line disclosure represents the exterior portion of the sidewall 190 which is not seen in this view because of the lip 150 that extends out over the sidewall the entire perimeter of the cover. In the preferred embodiment, the sidewall 190 is integrally formed somewhat perpendicular with the bottom 200 forming a cup, however, if a material other than plastic is used to form the cup, the sidewall 190 does not necessarily need to be integrally formed with the bottom 200, they can be connected through any conventional means of connecting such as welding, gluing, screwing, nailing, bolting and etc.

Figure 5:
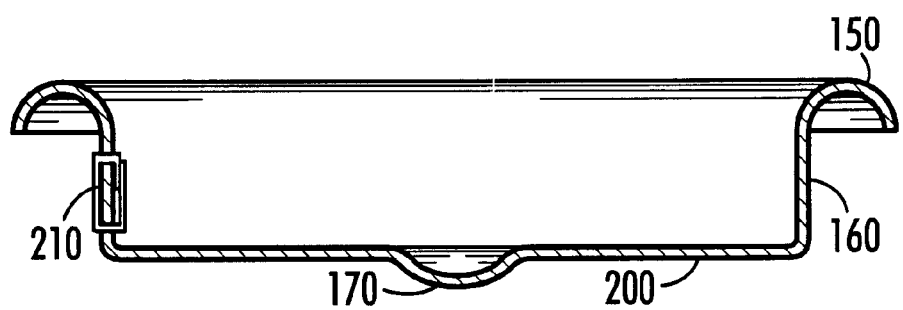
FIG. 5 is a broken-away side elevation view of the first embodiment of the cover taken along line 5—5 in FIG. 3 showing the metal clip in place on the cover.

FIG. 5 is a broken-away side elevation view of the first embodiment of the cover 20 showing the metal clip 210 in place on the cover 20 and the dimple 170 in the middle of the bottom 200. The metal clip 210 is connected to the cover 20 in order to keep the cover on the magnetic metal object retriever 10. The metal clip 210 is attracted to the magnet 140 of the head end 30 of the magnetic metal object retriever 10. When the head end 30 is placed within the sidewalls 190 of the cover 20, the metal clip 210 comes in contact with the magnet 140 and holds or retains the cover 20 in that position until removed. The metal clip 210 is located midway between the upper and lower ends of the sidewall 190 so that the metal clip 210 is in direct contact with the magnet 140 when the cover 20 is in place over the head end 30. The metal clip 210 does not have to be directly in the center of the width of the sidewall 190, only somewhere in the middle portions so as to line up with the magnet 140 of the head end 30. The dimple 170 has a larger diameter that the nut 180 of the head end 30 to allow the nut 180 to fit within or be seated in the dimple 170 when the head end 30 is in the cup portion of the cover 20. However, the cover 20 can be made without any dimple 170 so that the bottom 200 is merely flat.

Figure 6:
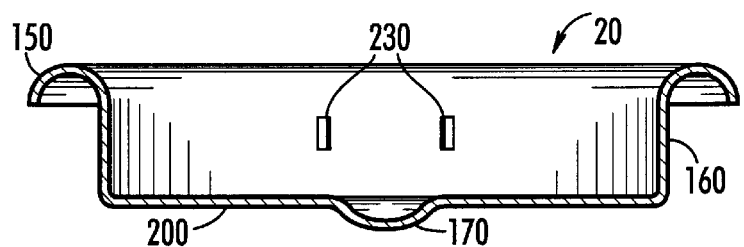
FIG. 6 is a broken-away front elevation view of the first embodiment of the cover taken along line 6—6 in FIG. 4 showing the metal clip openings in the rear of the cover.

FIG. 6 is a broken-away front elevation view of the first embodiment of the cover 20 showing the clip openings 230 in the rear of the cover 20. In this first embodiment there are two clip openings 230. Each clip opening 230 is a common geometric shape such as a rectangle or square, but other shapes are acceptable. In this embodiment, each clip opening 230 is rectangular in shape with the clip opening being taller than it is wide. The two clip openings 230 are located in the middle of the sidewall 190, from a top end to a bottom end, and spaced horizontally apart from one another and are parallel to one another. The distance between the two clip openings 230 depends upon the size of the metal clip 210 used and designer's preference.

Figure 7:
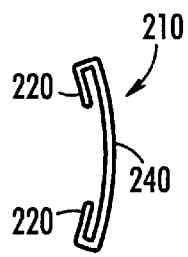
FIG. 7 is a top plan view of the metal clip of the first embodiment.

FIG. 7 is a top plan view of the metal clip 210 used in the first embodiment of the cover. In this first embodiment, one end 220 of the metal clip 210 is inserted into one of the clip openings 230 and the opposite end 220 of the metal clip 210 is inserted into the other clip opening 230 from the outside or exterior of the cover 20. Each end 220 of the metal clip 210 is then oriented by bending or being folded back toward the opposite end so that the metal clip has a cross-sectional shape of a modified "c" shape. This arrangement therefore provides for the cover 20 to stay removably attached to the head end 30 by having the metal clip 210 located on the outside of the cover 20 with the ends 220 located on the inside or interior of the cover 20. The ends 220 of the metal clip are magnetically attracted or pulled to the magnet 140 of the head end 30 and the middle portion or body 240 of the metal clip 210 abuts or lies next to the sidewall 190 of the cover 20 keeping the cover 20 in place around the head end 30 of the magnetic article retriever 10. The body 240 of the metal clip 210 is also magnetically attracted or pulled toward the magnet 140 of the head end 30 thereby reinforcing the connection between the cover 20 and the head end 30.

Figure 8:
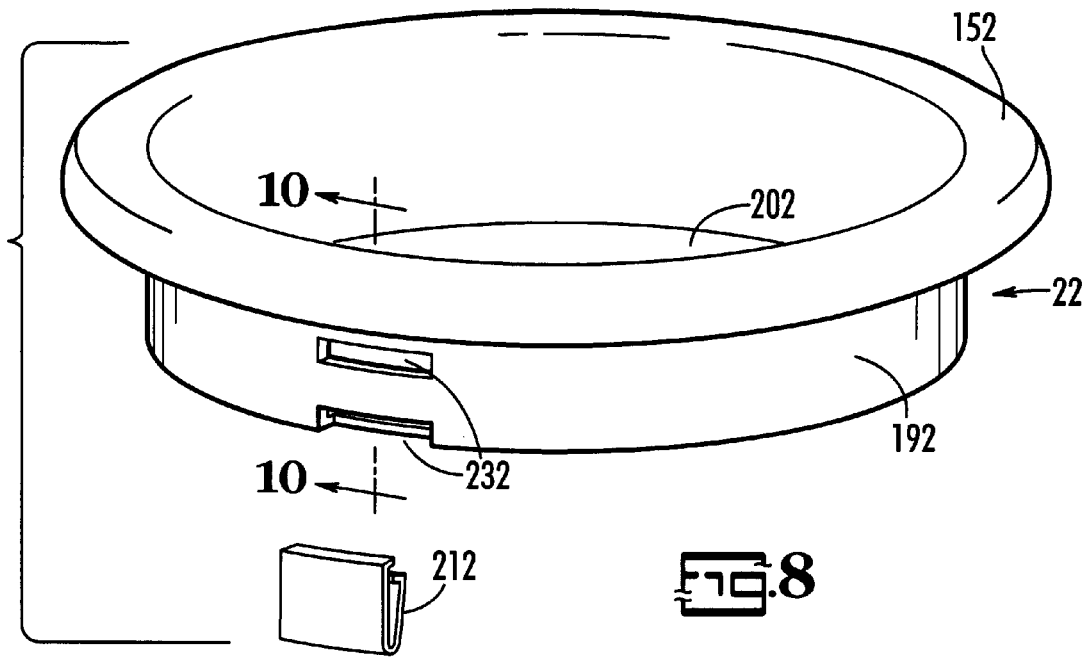
FIG. 8 is an exploded perspective view of a second embodiment of the cover with the metal clip removed.
Figure 9:
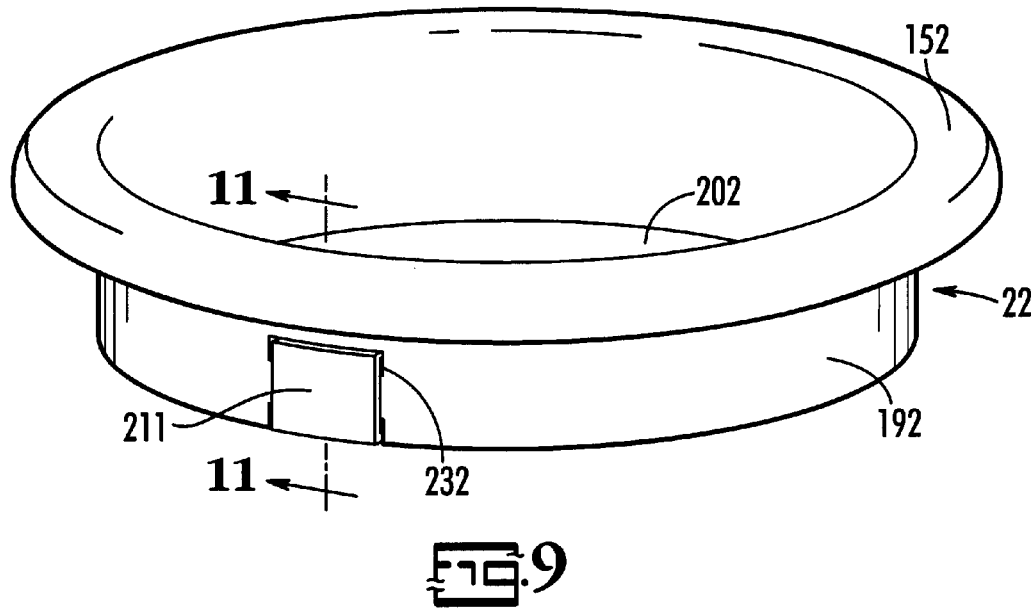
FIG. 9 is a perspective view of the second embodiment of the cover with the metal clip shown in place.

FIGS. 8–11 disclose a second and preferred embodiment of the cover 22 with the metal clip 212 having a different orientation and configuration than in the previous embodiment. FIG. 8 is an exploded perspective view of the cover 22 with the metal clip 212 removed for illustrative purposes. In this embodiment, the cover 22 is primarily the same as in the previous embodiment, that is, it is comprised of a sidewall 192 having a lip 152 and being connected to a bottom 202 to form a cup shaped element. The primary differences between the first and second embodiment being the orientation and locations of the metal clip openings 232 and the orientation and configuration of the metal clip 212. As shown in FIG. 8, the metal clip openings 232 are primarily horizontally oriented with an upper metal clip opening 232 being clearly within the sidewall 192 and the second metal clip opening 232 being partially within the sidewall 232 and partially within the bottom 202. As in the previous embodiment, the metal clip openings 232 are parallel and in line with one another and in this case, are wider than they are tall. With the metal clip openings 232 being oriented in this fashion, the metal clip 212 is then placed within the metal clip openings 232 with the ends 222 of the metal clip 212 overlapping in the upper metal clip opening 232 while the body portion of the metal clip 212 passes through the lower metal clip opening. FIG. 9 shows the clip in place in the cover 22. The metal clip 212 in this second embodiment has been reoriented so that the top portion of the metal clip 212 while in place will be located beside the magnet 140 on the inside of the cover 22. This is important so that the metal clip ends 222 will not interfere or catch on the top plate 70 and the bottom plate 130 while the cover 22 is in place or when being positioned on the head end 30.

Figure 10:
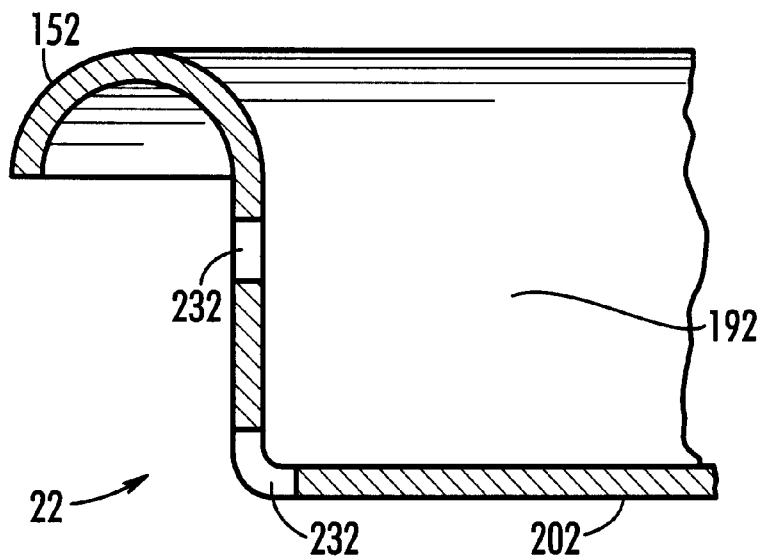
FIG. 10 is a broken-away sectional view of the second embodiment of the cover taken along line 10—10 in FIG. 8 showing the metal clip openings in the cover.
Figure 11:
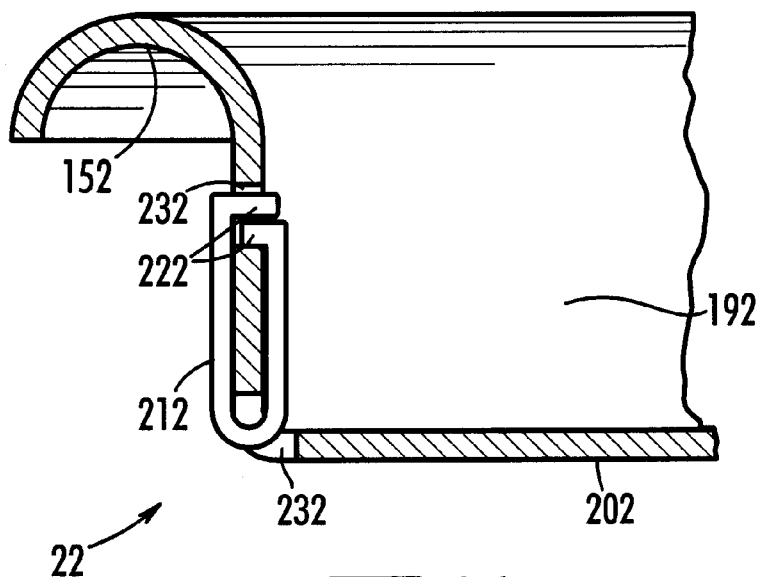
FIG. 11 is a broken-away sectional view of the second embodiment of the cover taken along line 11—11 in FIG. 9 showing the metal clip in place in the cover.

FIGS. 10 and 11, more clearly disclose the orientation of the metal clip openings 232 and their orientation to one another as well as the overall shape of the cover 22. FIG. 10 shows the upper metal clip opening 232 as being located in the sidewall 192 of the cover 22. This figure also depicts how a portion of the lower metal clip opening 232 is in the sidewall 192 and a portion is within the bottom 202 of the cover 22. FIG. 11 shows the metal clip 212 in place in the cover 22. The metal clip ends 222 are shown in this second embodiment of the cover 22 as overlapping one another with the body of the metal clip 212 extending down through the lower metal clip opening 232.

FIG. 12 is a side elevation view of a third embodiment of the cover 24 for the presently claimed invention. In this particular embodiment, the cover 24 is comprised of a body, much like that of a sock, having an open end 27 and a toe end 25. The head end 30 of the magnetic metal object retriever 10 is place inside the sock-like cover 24 by inserting it into the open end 27 and sliding the cover 24 up until the head end 30 is snugly within the toe end 25 of the cover 24. When the cover 24 is removed, the open end 27 is peeled back away from the head end 30 and rolled back over itself thus in essence turning the cover 24 inside out while removing it from the head end and ultimately trapping the metal objects 250 inside the cover 24. The cover 24 is made of any suitable conventional material or cloth that is durable and heavy duty.

FIG. 13 is a partial perspective view of a fourth embodiment of the cover 26 wherein the cover 26 is essentially a holster style cover 26. This embodiment of the cover 26 is similar in construction to the first two embodiments because it too is comprised of a body having one continuous sidewall 196 that is connected to a bottom 206. This embodiment differs from the first two embodiments because the sidewall 196 is also connected to a top 256. The top 256 has a channel 266 cut out of the middle and extending to one side to accommodate the shaft 60 at the lower end 80 of the handle 40 when the head end 30 is placed or slid into the cover 26. The sidewall 196 can be integrally formed with the top 256 and the bottom 206 or by any other conventional means of connection may be used such as gluing, nailing, screwing and etc. The combination of the top 256, sidewall 196 and bottom 206 form a cover 26 that is a holster or sleeve that can be slid on and off in the direction of the arrows as shown in FIG. 13. The cover 26 can be held onto the head end 30 of the magnetic metal object retriever 10 either by a friction fit or also by placing a metal clip 212 in the same manner as that described in the second embodiment. The cover 26 has a lip 276 that prevents the magnetic objects from sliding past the cover 26 and attaching themselves to the bare magnet 140 when the cover 26 is being removed. The lip 276 also helps to facilitate the removal of the cover 26 from the head end 30 by allowing the cover 26 to be easily grasped and manipulated.

To use the first and second embodiments (FIGS. 1–11) of the magnetic metal object retriever 10 with cover 20 is quick, easy and is used to pick up a variety of metal objects 250 such as nails or washers and place them in a desired location. With the cover 20 firmly in place over the head end 30 of the magnetic metal object retriever 10, the handle 40 can be extended or retracted to the desired length by twisting, turning or loosening the handle locking means 110 to an open position and sliding the lower end 80 of the handle 40 to the desired position. Once the length of the handle 40 is determined and the lower end 80 is in the desired position, the handle locking means 110 is twisted or tightened until in a tight or locked position thereby preventing the lower end 80 of the handle 40 from any further movement within the upper portion 90 of the handle 40. With the handle 40 the desired length, the handle is then gripped by the user in either one or two hands and passed over or waved about the area within which metal objects 250 may be located. Upon passing the magnetic metal object retriever 10 with cover 20 around the area containing metal objects 250, the metal objects 250 are attracted to the magnet 140 in the head end 30 and attach themselves to the cover 20. When the user decides to clean off the cover 20 they simply press the lip 150 of the cover 20 away from the head end 30 of the magnetic metal object retriever 10 and as the cover 20 is removed from the head end 30, the metal objects 250 will fall from the cover onto a location established by the user. This is a simple and effective means of removing metal objects 250 from the cover 20 without having to individually remove each and every metal object 250 which is laborious, time consuming and potentially harmful. The cover 20 is then placed back on the magnetic metal object retriever 10 by placing the head end 30 within the cup portion of the cover 20 until the cover is firmly held in place and ready for future uses. When not in use, the magnetic metal object retriever 10 with cover 20 may be stored by hanging it from the loop 120 at the end of grip 100 on the upper end 90 of the handle 40 or simply laying it in an out of the way place.

To use the third embodiment, shown in FIG. 12, the cover 24 is placed on the magnetic metal object retriever 10 by placing the head end 30 into the cover 24 at the open end 27 and sliding or pulling the cover 24 up onto the magnetic metal object retriever 10 until the head end 30 is securely within the toe end 25 of the cover 24. The magnetic metal object retriever 10 is then passed over and around various metal objects 250 as described above to collect such metal objects 250 onto the cover 24. The cover 24 is then removed from around the head end 30 by rolling back the open end 27 toward to toe end 25 thus turning the cover 24 inside out in the process of removing it. This traps the metal objects 250 within the cover 24 until they are needed. The cover 24 can also simply be slid off the head end 30 without being turned inside out if desired, the metal objects would then not be collected within the cover 24 but would instead be easily removed from the exterior of the cover 24 at the user's convenience.

The fourth embodiment, as shown in FIG. 13, is used by simply sliding the cover 26 on and off the head end 30 of the magnetic metal object holder 10, such movement is made easier by the aid of the lip 276. This cover 26 is slid or placed on and off the head end 30 by moving the cover 26 or the head end 30 in the direction of the arrows as shown in FIG. 13, pushing or pulling the lip 276 helps to facilitate easy movement of the cover 26. Once the cover 26 is in place, the shaft 60 will protrude out through the channel 266 and the magnetic metal object retriever 10 is used in the same manner as previously described. Once the metal objects 250 are collected on the outer surface of the cover 26, the cover 26 is then removed by sliding or pulling it, with the aid of the lip 276, off the head end 30 of the magnetic metal object retriever 10. This breaks the magnetic bond between the metal objects 250 and the head end 30 due to the magnet 140 and the metal objects 250 are then easily picked, shaken or allowed to fall off the cover 26. The cover 26 can then be replaced on the head end 30 awaiting the next use.

The magnetic metal object retriever 10 with cover 20 described herein and illustrated in the drawings is subject to other advantages and modifications that may be apparent to those of ordinary skill in the art without departing from the spirit and scope of the appended claims. Accordingly, the invention is to be limited only by the scope of the following claims and their equivalents.

What is claimed is:

1. A method of using a magnetic metal object retriever with cover comprising:

providing a head end having a top plate, a magnet and a bottom plate all connected together; an extendible handle connected to said head end and having a locking means for locking said handle into a desired length; and a cover having a body with a metal clip, said cover removably attached to said head end;

collecting metal objects on said cover; and removing said cover thereby removing said metal objects.

2. A magnetic retrieval device for metal objects comprising:

a head end comprising of a magnet secured between a non-magnetic top plate and a non-magnetic bottom plate;

an extensible handle having a lower shaft secured to said head end, an upper shaft slidable outside said lower shaft and locking means securing said upper shaft to said lower shaft;

a cover member comprising a body conforming to the shape of said head end and at least one metal clip providing means for securing said cover to said head end.

3. A magnetic retrieval device according to claim 2 wherein said at least one metal clip is inserted into at least one opening in said cover member.

4. A magnetic retrieval device according to claim 2 wherein said cover member has a lip.

5. A magnetic retrieval device according to claim 4 wherein said cover and said lip are formed from a plastic.

6. A magnetic retrieval device according to claim 4 wherein said cover and said lip are formed from aluminum.

* * * * *